United States Patent
Kanou et al.

(10) Patent No.: US 8,938,964 B2
(45) Date of Patent: Jan. 27, 2015

(54) WASTE HEAT UTILIZATION APPARATUS FOR INTERNAL COMBUSTION ENGINE

(75) Inventors: Yasuaki Kanou, Isesaki (JP); Junichiro Kasuya, Isesaki (JP)

(73) Assignee: Sanden Corporation, Gunma (JP)

( * ) Notice: Subject to any disclaimer, the term of this patent is extended or adjusted under 35 U.S.C. 154(b) by 100 days.

(21) Appl. No.: 13/824,947

(22) PCT Filed: Sep. 21, 2011

(86) PCT No.: PCT/JP2011/071478
§ 371 (c)(1),
(2), (4) Date: Mar. 18, 2013

(87) PCT Pub. No.: WO2012/043335
PCT Pub. Date: Apr. 5, 2012

(65) Prior Publication Data
US 2013/0199178 A1    Aug. 8, 2013

(30) Foreign Application Priority Data

Sep. 30, 2010 (JP) ................... 2010-220987

(51) Int. Cl.
*F01K 23/10* (2006.01)
*F02G 3/00* (2006.01)
*F02B 33/44* (2006.01)
(Continued)

(52) U.S. Cl.
CPC .................. *F02M 25/07* (2013.01); *F01K 7/22* (2013.01); *F01K 23/065* (2013.01); *F02G 5/02* (2013.01); *F02G 5/04* (2013.01); *F02M 25/0731* (2013.01); *F02M 25/0738* (2013.01); *F02M 25/0707* (2013.01); *Y02T 10/121* (2013.01); *Y02T 10/166* (2013.01); *Y02E 20/14* (2013.01); *F02B 37/004* (2013.01); *F02B 37/005* (2013.01)
USPC ......... 60/618; 60/168; 60/605.2; 123/568.11; 123/568.12

(58) Field of Classification Search
CPC ............ F02G 5/04; F02G 5/02; F02M 25/07; F02M 25/0731; F02M 25/0738; F01K 21/005
USPC ........ 60/618, 616, 605.2; 123/568.11, 568.12
See application file for complete search history.

(56) References Cited

U.S. PATENT DOCUMENTS 6,910,333 B2 * 6/2005 Minemi et al. .................. 60/618
7,721,543 B2 * 5/2010 Massey et al. .................. 60/618
(Continued)

FOREIGN PATENT DOCUMENTS

CN    101243243    8/2008
CN    101566113    10/2009
(Continued)

*Primary Examiner* — Christopher Jetton
*Assistant Examiner* — Ngoc T Nguyen
(74) *Attorney, Agent, or Firm* — Cozen O'Connor

(57) ABSTRACT

A Rankine circuit (40) includes, as a plurality of heat exchangers, an EGR cooler (36) of an EGR circuit and an exhaust gas heat exchanger (41) associated with an exhaust passage. The EGR cooler and the exhaust gas heat exchanger are arranged such that the EGR cooler is located upstream of the exhaust gas heat exchanger as viewed in the flowing direction of a working fluid in the Rankine circuit. The amount of heat transferred from EGR gas to the working fluid in the EGR cooler is controlled by a control unit (60) so that the temperature of the EGR gas detected by an EGR gas temperature detector (39) may fall within a predetermined temperature range (e.g., 150° C. to 200° C.).

7 Claims, 9 Drawing Sheets

(51) Int. Cl.
*F02M 25/07* (2006.01)
*F01K 7/22* (2006.01)
*F01K 23/06* (2006.01)
*F02G 5/02* (2006.01)
*F02G 5/04* (2006.01)
*F02B 37/00* (2006.01)

(56) References Cited

U.S. PATENT DOCUMENTS

| | | | |
|---|---|---|---|
| 2005/0262842 A1* | 12/2005 | Claassen et al. | 60/618 |
| 2009/0211253 A1* | 8/2009 | Radcliff et al. | 60/670 |
| 2009/0277173 A1* | 11/2009 | Ernst et al. | 60/616 |
| 2012/0144825 A1* | 6/2012 | Stegmaier et al. | 60/609 |
| 2012/0192560 A1* | 8/2012 | Ernst et al. | 60/616 |
| 2012/0204558 A1* | 8/2012 | Stegmaier et al. | 60/605.2 |

FOREIGN PATENT DOCUMENTS

| | | |
|---|---|---|
| JP | 2001-132442 | 5/2001 |
| JP | 2007-239513 | 9/2007 |
| JP | 2008-38916 | 2/2008 |
| WO | WO 2009/119185 | 10/2009 |
| WO | WO 2010/024246 | 3/2010 |

* cited by examiner

US 8,938,964 B2

WASTE HEAT UTILIZATION APPARATUS FOR INTERNAL COMBUSTION ENGINE

RELATED APPLICATIONS

This is a U.S. national stage of application No. PCT/JP2011/071478 filed on Sep. 21, 2011.

This patent application claims the priority of Japanese application no. 2010-220987 filed Sep. 30, 2010, the disclosure content of which is hereby incorporated by reference.

TECHNICAL FIELD

The present invention relates to waste heat utilization apparatus for internal combustion engines, and more particularly, to a waste heat utilization apparatus suited for recovering and utilizing waste heat of an internal combustion engine of a motor vehicle.

BACKGROUND ART

This type of waste heat utilization apparatus is provided with a Rankine cycle having a circulation path for circulating a refrigerant as a working fluid. In the Rankine cycle, an evaporator for heating and evaporating the working fluid by making use of waste heat from the internal combustion engine, an expander for expanding the working fluid supplied thereto from the evaporator to generate rotary driving force, a driven unit to which the rotary driving force generated by the expander is transmitted, a condenser for condensing the working fluid supplied thereto from the expander, and a pump for delivering the working fluid supplied thereto from the condenser to the evaporator are sequentially inserted in the circulation path.

Waste heat from the internal combustion engine includes the heat of EGR (Exhaust Gas Recirculation) gas, which is part of the exhaust gas recirculated to the intake side for the purpose of reducing $NO_x$, that is, the heat released from an EGR cooler arranged in an EGR passage to lower the temperature of the EGR gas. A Rankine cycle system utilizing the heat of the EGR gas has been known in the art (cf. Patent Document 1).

PRIOR ART DOCUMENTS

Patent Documents

Patent Document 1: Japanese Laid-open Patent Publication No. 2007-239513

SUMMARY OF THE INVENTION

Problems to be Solved by the Invention

According to the technique disclosed in Patent Document 1, the Rankine cycle system is so configured as to make use of the EGR gas as a heat source. Thus, depending on the operating condition of the internal combustion engine, for example, the flow rate of the EGR gas needs to be increased or decreased by adjusting an EGR valve arranged in the EGR passage. While the supply of the EGR gas is cut off by the EGR valve, therefore, heat of the EGR gas is not available to the Rankine cycle system at all.

Also, in the technique disclosed in Patent Document 1, since heat of the EGR gas is consumed by the Rankine cycle system, the temperature of the EGR gas correspondingly lowers. Generally, however, if the temperature of the EGR gas drops below 100° C., the moisture contained in the EGR gas condenses and produces acid, giving rise to a problem that the EGR passage and the like are corroded by the produced acid. Thus, a solution to the problem of how to prevent condensation of the moisture contained in the EGR gas has been awaited.

Further, the technique disclosed in Patent Document 1 uses the EGR gas as a basic heat source. Where a Rankine cycle system is configured so as to utilize a plurality of other heat sources available in the internal combustion engine than the EGR gas, for example, a problem of how to configure the Rankine cycle system by using the multiple heat sources of the internal combustion engine also arises.

The present invention was created in view of the above problems, and an object thereof is to provide a waste heat utilization apparatus for an internal combustion engine whereby multiple heat sources of the internal combustion engine, including EGR gas, can be efficiently used for a Rankine cycle system without causing condensation of the moisture contained in the EGR gas.

Means for Solving the Problems

To achieve the object, the present invention provides a waste heat utilization apparatus for an internal combustion engine, comprising: a Rankine circuit including a circulation path for circulating a working fluid, a plurality of heat exchangers for heating the working fluid with use of waste heat of the internal combustion engine, an expander for expanding the working fluid supplied thereto via the plurality of heat exchangers to generate rotary driving force, a condenser for condensing the working fluid supplied thereto via the expander, and a pump for delivering the working fluid supplied thereto via the condenser to the heat exchangers, wherein the plurality of heat exchangers, the expander, the condenser and the pump are sequentially inserted in the circulation path; an exhaust gas heat exchanger inserted in an exhaust passage through which exhaust gas of the internal combustion engine is emitted to atmosphere; an EGR circuit including an EGR passage for recirculating part of the exhaust gas as EGR gas to an intake side of the internal combustion engine, an EGR valve inserted in the EGR passage and opened and closed at least in accordance with an operating condition of the internal combustion engine, to permit and block recirculation of the EGR gas, and an EGR cooler inserted in the EGR passage to cool the EGR gas; an EGR gas temperature detector arranged in the EGR passage at a location downstream of the EGR cooler, as viewed in a flowing direction of the EGR gas, to detect temperature of the EGR gas; and a control unit configured to control an amount of heat transferred from the EGR gas in the EGR cooler at least while the EGR valve is opened to permit the recirculation of the EGR gas, wherein the plurality of heat exchangers of the Rankine circuit are the EGR cooler and the exhaust gas heat exchanger and are configured such that the EGR cooler is located upstream of the exhaust gas heat exchanger as viewed in the flowing direction of the working fluid in the circulation path, that the working fluid is heated in the EGR cooler with use of heat of the EGR gas, and that the working fluid is heated in the exhaust gas heat exchanger with use of heat of the exhaust gas, and wherein the control unit controls the amount of heat transferred from the EGR gas to the working fluid in the EGR cooler such that the temperature of the EGR gas detected by the EGR gas temperature detector falls within a predetermined temperature range (claim 1).

Preferably, the control unit variably controls pressure of the working fluid flowing through the EGR cooler by varying a load of the expander of the Rankine circuit such that the temperature of the EGR gas detected by the EGR gas temperature detector falls within the predetermined temperature range (claim 2).

The control unit may variably control a flow rate of the working fluid flowing through the EGR cooler by varying a displacement of the pump of the Rankine circuit such that the temperature of the EGR gas detected by the EGR gas temperature detector falls within the predetermined temperature range (claim 3).

The Rankine circuit may further include an EGR cooler bypass passage diverging from the circulation path to bypass the EGR cooler and then joining the circulation path, and a regulating valve configured to regulate a flow of the working fluid to the circulation path and to the EGR cooler bypass passage, wherein the control unit variably controls a flow rate of the working fluid flowing through the EGR cooler by adjusting the regulating valve such that the temperature of the EGR gas detected by the EGR gas temperature detector falls within the predetermined temperature range (claim 4).

The waste heat utilization apparatus may further comprise a cooling water circuit including a cooling water passage for causing cooling water of the internal combustion engine to circulate through a radiator, and a cooling water heat exchanger inserted in the cooling water passage to allow heat to transfer from the cooling water to the working fluid, wherein the cooling water heat exchanger is preferably located upstream of the EGR cooler and the exhaust gas heat exchanger as viewed in the flowing direction of the working fluid in the circulation path of the Rankine circuit (claim 5).

The Rankine circuit may further include a cooling water heat exchanger bypass passage diverging from the circulation path to bypass the cooling water heat exchanger and then joining the circulation path, a second regulating valve configured to regulate a flow of the working fluid to the circulation path and to the cooling water heat exchanger bypass passage, and a cooling water temperature detector configured to detect temperature of the cooling water being returned to the internal combustion engine, wherein the control unit variably controls a flow rate of the working fluid flowing through the cooling water heat exchanger by adjusting the second regulating valve such that the temperature of the cooling water detected by the cooling water temperature detector does not become lower than or equal to a specified temperature (claim 6).

The control unit may variably control an amount of heat absorbed in the cooling water heat exchanger by adjusting the second regulating valve to vary the flow rate of the working fluid flowing through the cooling water heat exchanger such that the temperature of the EGR gas detected by the EGR gas temperature detector falls within the predetermined temperature range (claim 7).

Advantageous Effects of the Invention

In the waste heat utilization apparatus according to the present invention, the Rankine circuit has a plurality of heat exchangers, namely, the EGR cooler of the EGR circuit and the exhaust gas heat exchanger associated with the exhaust passage, and the EGR cooler and the exhaust gas heat exchanger are arranged such that the EGR cooler is located upstream of the exhaust gas heat exchanger as viewed in the flowing direction of the working fluid in the Rankine circuit. The control unit controls the amount of heat transferred from the EGR gas to the working fluid in the EGR cooler so that the EGR gas temperature detected by the EGR gas temperature detector may fall within the predetermined temperature range.

Thus, while the EGR gas is recirculated, the working fluid in the Rankine circuit first absorbs heat of the EGR gas in the EGR cooler to lower the temperature of the EGR gas to fall within the predetermined temperature range, and then further absorbs heat of the exhaust gas in the exhaust gas heat exchanger.

Consequently, the temperature of the EGR gas can be kept, for example, at 100° C. or higher in which the moisture contained in the EGR gas does not condense to produce acid, thereby preventing corrosion of the EGR passage and the EGR valve, and at the same time the working fluid in the Rankine circuit can be made to satisfactorily absorb heat of the EGR gas in the EGR cooler, thereby lowering the temperature of the EGR gas to fall within the predetermined temperature range. Further, the working fluid in the Rankine circuit is allowed to absorb heat from the exhaust gas in the exhaust gas heat exchanger, whereby waste heat of the internal combustion engine can be efficiently utilized (claim 1).

Even while the EGR gas is not recirculated, the working fluid in the Rankine circuit can absorb heat of the exhaust gas in the exhaust gas heat exchanger, so that the temperature and pressure of the working fluid rise. Thus, also in this case, the waste heat of the internal combustion engine can be efficiently utilized.

The amount of heat transferred in the EGR cooler can be adjusted by varying the load of the expander in the Rankine circuit to vary the pressure of the working fluid flowing through the EGR cooler, that is, by varying the evaporating temperature, so that the EGR gas temperature can be kept within the predetermined temperature range (claim 2).

Also, the amount of heat transferred in the EGR cooler can be adjusted by variably controlling the displacement of the pump in the Rankine circuit to vary the flow rate of the working fluid flowing through the EGR cooler so that the EGR gas temperature can be kept within the predetermined temperature range (claim 3).

Further, the amount of heat transferred in the EGR cooler can be adjusted by adjusting the regulating valve, which regulates the flow of the working fluid to the circulation path and to the EGR cooler bypass passage, to vary the flow rate of the working fluid flowing through the EGR cooler so that the EGR gas temperature can be kept within the predetermined temperature range (claim 4).

The cooling water heat exchanger, the EGR cooler and the exhaust gas heat exchanger are arranged such that the cooling water heat exchanger is located upstream of the EGR cooler and the exhaust gas heat exchanger as viewed in the flowing direction of the working fluid in the Rankine circuit, and the control unit controls the amount of heat transferred from the EGR gas to the working fluid in the EGR cooler so that the EGR gas temperature detected by the EGR gas temperature detector may fall within the predetermined temperature range.

Thus, while the EGR gas is recirculated, the working fluid in the Rankine circuit first absorbs heat of the cooling water in the cooling water heat exchanger, then absorbs heat of the EGR gas in the EGR cooler to lower the temperature of the EGR gas to fall within the predetermined temperature range, and further absorbs heat of the exhaust gas in the exhaust gas heat exchanger.

In this manner, the working fluid in the Rankine circuit first absorbs, in the cooling water heat exchanger, heat of the cooling water which is lower in temperature than the EGR gas and the exhaust gas, and with the temperature of the EGR gas kept within the predetermined temperature range of, for example, 100° C. and above in which the moisture contained in the EGR gas does not condense to produce acid, the working fluid in the Rankine circuit is allowed to satisfactorily absorb heat of the EGR gas in the EGR cooler, whereby corrosion of the EGR passage and the EGR valve is prevented. Furthermore, the working fluid in the Rankine circuit is allowed to absorb heat from the exhaust gas in the exhaust gas heat exchanger, whereby the waste heat of the internal combustion engine can be utilized more efficiently (claim 5).

The amount of heat transferred in the cooling water heat exchanger can be adjusted by adjusting the second regulating valve, which regulates the flow of the working fluid to the circulation path and to the cooling water heat exchanger bypass passage, to vary the flow rate of the working fluid flowing through the cooling water heat exchanger so that the cooling water temperature may not become lower than or equal to the specified temperature. This makes it possible to prevent lowering in the efficiency of the internal combustion engine (claim 6).

Also, the amount of heat transferred in the EGR cooler can be adjusted by adjusting the second regulating valve to vary the flow rate of the working fluid flowing through the cooling water heat exchanger and thereby vary the amount of heat absorbed in the cooling water heat exchanger so that the EGR gas temperature may be kept within the predetermined temperature range. For example, where the temperature of the EGR gas is higher than the predetermined temperature range, the second regulating valve is adjusted to decrease the flow rate of the working fluid flowing through the cooling water heat exchanger so that the amount of heat absorbed in the cooling water heat exchanger may be reduced, whereby the absorption of heat of the EGR gas in the EGR cooler by the working fluid can be promoted (claim 7).

MODE FOR CARRYING OUT THE INVENTION

Embodiments of the present invention will be described below with reference to the drawings.

First Embodiment

Figure 1:
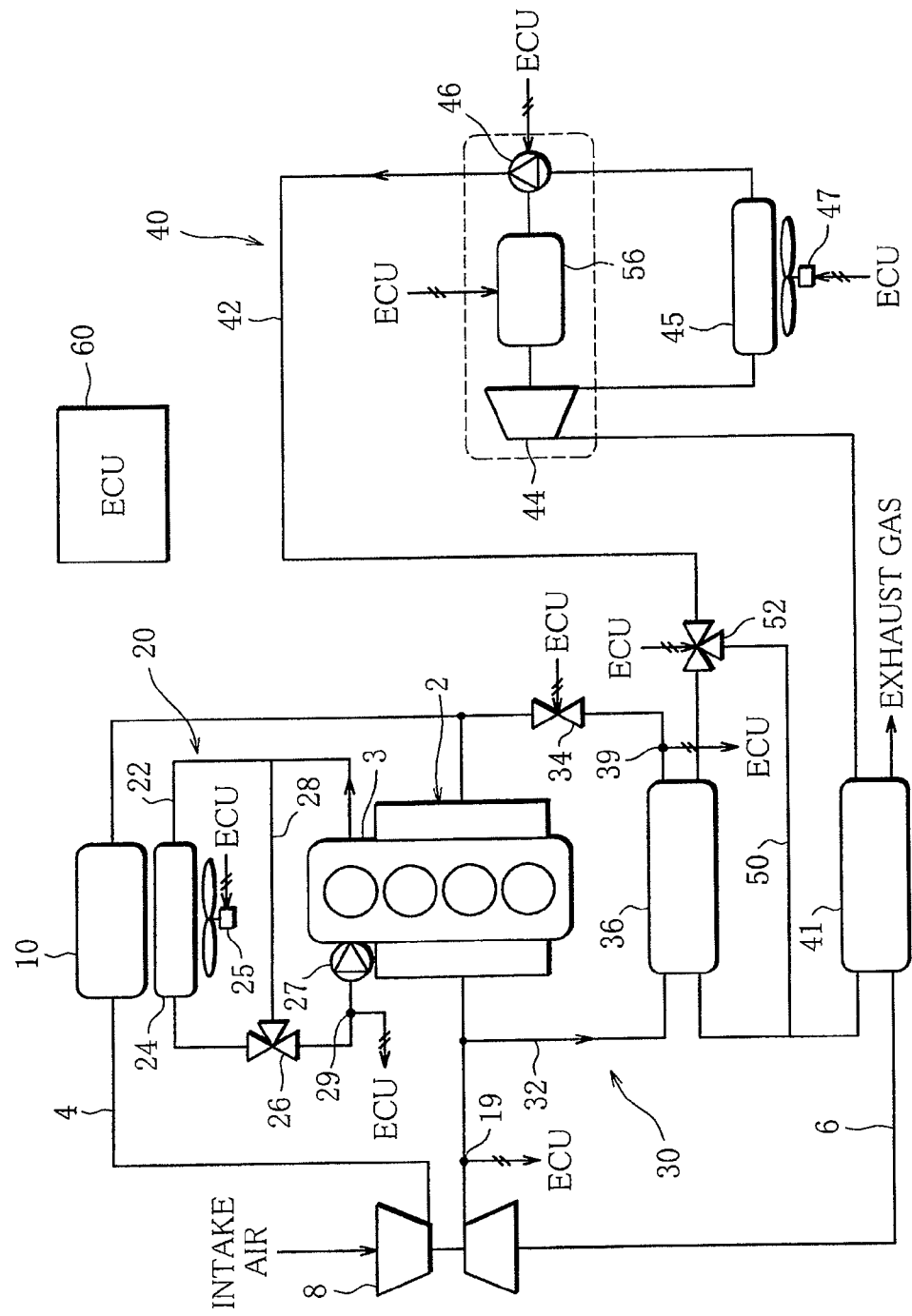
FIG. 1 schematically illustrates a waste heat utilization apparatus for an internal combustion engine according to a first embodiment of the present invention.

FIG. 1 schematically illustrates a waste heat utilization apparatus for an internal combustion engine according to a first embodiment of the present invention.

The waste heat utilization apparatus is mounted on a motor vehicle, for example, and comprises an engine 2 and a Rankine circuit 40.

The engine 2 has an engine body (internal combustion engine) 3 which is, for example, a diesel engine. An intake passage 4 is connected to intake ports of the engine body 3 through an intake manifold, and an exhaust passage 6 is connected to exhaust ports of the engine body 3 through an exhaust manifold. A supercharger 8 is arranged across the intake and exhaust passages 4 and 6 so that the flow of exhaust gas can be utilized for supercharging intake air. An intercooler 10 is inserted in the intake passage 4 so as to cool the intake air and thereby improve the volumetric efficiency of the intake air.

The engine 2 is provided with a cooling water circuit 20 for circulating cooling water through a water jacket of the engine body 3. The cooling water circuit 20 includes a cooling water circulation passage 22 communicating with the water jacket, and a radiator 24, a thermostat 26, a water pump 27 driven by the engine body 3, and the engine body 3 are sequentially inserted in the cooling water circulation passage 22 in the mentioned order as viewed in the flowing direction of the cooling water, to constitute the cooling water circuit 20. At the thermostat 26, a radiator bypass passage 28 bypassing the radiator 24 joins the cooling water circulation passage 22. Thus, the thermostat 26 is capable of automatically causing the cooling water to bypass or flow through the radiator 24 depending on the temperature of the cooling water. The radiator 24 is associated with a cooling fan 25. Accordingly, at the radiator 24, heat is transferred from the cooling water to outside air, so that the engine body 3 is cooled.

Also, the engine 2 is provided with an EGR circuit (exhaust gas recirculation circuit) 30, which recirculates part of the exhaust gas as EGR (Exhaust Gas Recirculation) gas to the intake side in order to reduce chiefly $NO_x$. The EGR circuit 30 is constituted by an EGR valve 34 for adjusting the flow rate of the EGR gas, and an EGR cooler 36 for lowering the temperature of the EGR gas, both inserted in an EGR passage 32.

The Rankine circuit 40 includes a circulation path 42 for circulating a working fluid (e.g., ethanol). The EGR cooler (heat exchanger) 36, an exhaust gas heat exchanger (heat exchanger, superheater) 41 which allows heat to transfer from the exhaust passage 6 to the working fluid, an expander 44 for generating rotary driving force by making use of expansion of the working fluid which has been heated by the EGR cooler 36 and the exhaust gas heat exchanger 41 into a superheated state, a Rankine condenser (condenser) 45 and a pump 46 for circulating the working fluid are sequentially inserted in the circulation path 42 in the mentioned order, as viewed in the flowing direction of the working fluid, to constitute the Rankine circuit 40. The Rankine condenser 45 is associated with a cooling fan 47.

An EGR cooler bypass passage 50 bypassing the EGR cooler 36 diverges from the circulation path 42 of the Rankine circuit 40. A three-way valve (regulating valve) 52 is inserted at the diverging point where the EGR cooler bypass passage 50 diverges from the circulation path 42.

In the Rankine circuit 40 configured as described above, the working fluid absorbs heat, at the EGR cooler 36, from the EGR gas recirculated through the EGR circuit 30 and also absorbs heat, at the exhaust gas heat exchanger 41, from the exhaust gas flowing through the exhaust passage 6 of the engine 2, whereby waste heat of the engine 2 can be recovered.

The EGR cooler 36 is arranged upstream of the exhaust gas heat exchanger 41 for the following reason: If the working fluid is passed first through the exhaust gas heat exchanger 41, then the working fluid may fully absorb heat at the exhaust gas heat exchanger 41 and may fail to absorb a sufficient amount of heat at the EGR cooler 36, causing the possibility that the temperature of the EGR gas fails to drop to a predetermined temperature.

The expander 44 is coupled with an electric generator 56 synchronously rotatably therewith as well as with the pump 46. Accordingly, the rotary driving force generated by the expander 44 is transmitted to the electric generator 56 and the pump 46, whereby electric power is generated by the electric generator 56 and the working fluid is circulated by the pump 46. The electric generator 56 is configured such that a power generation load thereof is variable, and the pump 46 is configured such that a displacement thereof is variable. The electric power generated by the electric generator 56 is stored in a battery and is used, for example, as a power source for an air conditioning system of the vehicle or, where the vehicle is a refrigerator car, as a power source for a refrigerating compressor.

A cooling water temperature sensor (cooling water temperature detector) 29 for detecting the temperature Tw of the cooling water is arranged in the cooling water circulation passage 22 of the cooling water circuit 20 at a location close to the water pump 27. An EGR gas temperature sensor (EGR gas temperature detector) 39 for detecting the temperature Tegr of the EGR gas is arranged in the EGR passage 32 of the EGR circuit 30 at a location downstream of the EGR cooler 36. An exhaust gas temperature sensor 19 for detecting the temperature Tex of the exhaust gas is arranged in the exhaust passage 6 of the engine 2 at a location close to the exhaust manifold.

The waste heat utilization apparatus is equipped with an electronic control unit (ECU) (control unit) 60 for performing integrated control of the engine 2 and the Rankine circuit 40. The input side of the ECU 60 is electrically connected with various sensors such as the exhaust gas temperature sensor 19, the cooling water temperature sensor 29 and the EGR gas temperature sensor 39. The output side of the ECU 60 is electrically connected to various devices such as the cooling fan 25, the EGR valve 34, the pump 46, the cooling fan 47, the three-way valve 52, and the electric generator 56.

Thus, based on the information input from the exhaust gas temperature sensor 19, the cooling water temperature sensor 29 and the EGR gas temperature sensor 39, the ECU 60 can appropriately control the cooling fan 25, the EGR valve 34, the pump 46, the cooling fan 47, the three-way valve 52 and the electric generator 56.

Operation of the waste heat utilization apparatus of the first embodiment configured as described above will be now explained.

When the engine body 3 is started, the engine 2 starts to drive the water pump 27 of the cooling water circuit 20, so that the cooling water begins to circulate through the cooling water circulation passage 22. If, at this time, the engine body 3 is started in a cold state and the temperature Tw of the cooling water is lower than a predetermined temperature T1 (thermostat-set value), the cooling water is caused to bypass the radiator 24 by the thermostat 26, and when the cooling water temperature Tw becomes equal to the predetermined temperature T1, the cooling water is allowed to flow through the radiator 24 to be cooled. In this manner, when the engine body 3 is started in a cold state, warm-up of the engine body 3 is expedited, and after the engine body 3 is warmed up, the operation of the cooling fan 25 is controlled appropriately so that the temperature Tw of the cooling water cooled by the radiator 24 may be kept at a predetermined temperature T2 (e.g., 80° C.).

When the engine 2 is operating in a state such that the EGR gas can be recirculated to the intake side, the EGR gas is recirculated through the EGR passage 32 at a flow rate corresponding to the opening of the EGR valve 34.

If, at this time, the three-way valve 52 of the Rankine circuit 40 is operated to cause the working fluid to flow to the EGR cooler 36, heat is transferred in the EGR cooler 36 from the EGR gas to the working fluid flowing through the circulation path 42. As a result, the temperature of the EGR gas lowers, and the temperature and pressure of the working fluid rise.

After absorbing heat in the EGR cooler 36, the working fluid flowing through the circulation path 42 of the Rankine circuit 40 further absorbs heat from the exhaust gas in the exhaust gas heat exchanger 41. Consequently, the temperature of the exhaust gas lowers, and the temperature and pressure of the working fluid further rise.

The working fluid thus raised in temperature and pressure flows into the expander 44, whereupon the expander 44 generates rotary driving force. As a result, the electric generator 56 is driven to generate electric power, and the pump 46 is driven to circulate the working fluid through the circulation path 42.

The working fluid is discharged from the expander 44 with its pressure reduced, and the heat of the low-pressure working fluid is released to the outside air by the Rankine condenser 45.

In this manner, heat of the EGR gas in the EGR circuit 30 and heat of the exhaust gas in the exhaust passage 6 are absorbed by the working fluid flowing in the circulation path 42 of the Rankine circuit 40, and the electric generator 56 is driven by the working fluid raised in temperature and pressure, to generate electric power. The amount of heat (heat transfer amount) absorbed by the working fluid in the EGR cooler 36 is adjusted as needed by the ECU 60. Specifically, based on the EGR gas temperature Tegr detected by the EGR gas temperature sensor 39, the amount of heat absorbed by the working fluid is controlled so that the temperature Tegr of the EGR gas recirculated to the intake side may be kept at a predetermined temperature T3.

Provided that the evaporating temperature of the EGR cooler 36 is 100° C. or above, the predetermined temperature T3 is set to a value falling within a range from 150° C. to 200° C. (predetermined temperature range), for example. The predetermined temperature T3 is set, by way of example, to 150° C. to 200° C. higher than 100° C. for the following reason: If the EGR gas temperature Tegr is lower than 100° C., the moisture contained in the EGR gas condenses and produces acid, which possibly corrodes the EGR passage 32, the EGR valve 34 and the like, but at the same time the EGR gas temperature Tegr should desirably be as low as possible.

Specifically, since the amount of heat absorbed by the working fluid can be controlled by adjusting the evaporating temperature, that is, evaporating pressure of the working fluid flowing through the EGR cooler 36, the load of the expander 44 and thus of the electric generator 56 is variably controlled by the ECU 60 to adjust the pressure of the working fluid so that the temperature Tegr of the EGR gas may be kept at the predetermined temperature T3.

The amount of heat absorbed by the working fluid can also be controlled by adjusting the flow rate of the working fluid flowing through the EGR cooler 36. Accordingly, the displacement (discharge rate) of the pump 46 is variably controlled by the ECU 60 to adjust the flow rate of the working fluid so that the EGR gas temperature Tegr may be kept at the predetermined temperature T3.

Since the flow rate of the working fluid flowing through the EGR cooler 36 can also be controlled by adjusting the opening of the three-way valve 52, the opening of the three-way valve 52 may alternatively be variably controlled by the ECU 60 to adjust the flow rate of the working fluid so that the EGR gas temperature Tegr may be kept at the predetermined temperature T3.

These control methods may be used in combination. That is, the load of the electric generator 56, the displacement of the pump 46 and the opening of the three-way valve 52 may be variably controlled so that the EGR gas temperature Tegr may be kept at the predetermined temperature T3.

Figure 2:
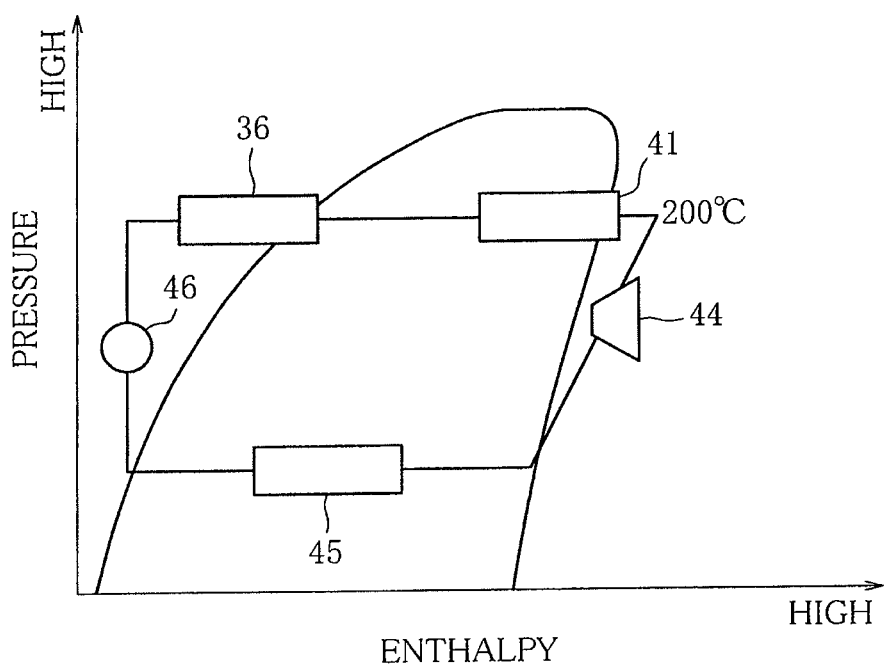
FIG. 2 is a schematic Mollier diagram illustrating the first embodiment.

In the waste heat utilization apparatus according to the first embodiment of the present invention, the EGR cooler 36 and the exhaust gas heat exchanger 41 of the Rankine circuit 40 are arranged on upstream and downstream sides, respectively, as viewed in the flowing direction of the working fluid. Accordingly, as seen from the schematic Mollier diagram of FIG. 2 illustrating the first embodiment, the working fluid flowing through the circulation path 42 of the Rankine circuit 40 can be made to first absorb heat from the EGR gas in the EGR cooler 36, thereby sufficiently lowering the temperature of the EGR gas, and then to absorb heat from the exhaust gas in the exhaust gas heat exchanger 41. This makes it possible to drive the expander 44 by the working fluid raised in temperature and pressure, whereby the waste heat of the engine 2 can be effectively utilized for the generation of electric power by the electric generator 56.

In particular, the load of the electric generator 56 is variably controlled to adjust the pressure of the working fluid, or the displacement of the pump 46 is variably controlled to adjust the flow rate of the working fluid, or the opening of the three-way valve 52 is variably controlled to adjust the flow rate of the working fluid, or these control methods are used in combination so that the temperature Tegr of the EGR gas may be kept at the predetermined temperature T3. Thus, while the EGR gas is recirculated, the EGR gas temperature Tegr can be reliably kept at the predetermined temperature T3 (e.g., 150° C. to 200° C.), and since the moisture contained in the EGR gas is prevented from condensing to produce acid, corrosion of the EGR passage 32, the EGR valve 34 and the like can be satisfactorily prevented.

On the other hand, while the engine 2 is operating in such a state that the EGR gas should not be recirculated to the intake side, heat of the EGR gas is not available to the Rankine circuit 40 because the EGR valve 34 is shut off so that the EGR gas may not be recirculated to the intake side. In such case, the working fluid flowing through the circulation path 42 of the Rankine circuit 40 absorbs heat only from the exhaust gas in the exhaust gas heat exchanger 41. As a result, the temperature of the exhaust gas lowers, and the temperature and pressure of the working fluid increase.

Thus, even while the recirculation of the EGR gas is stopped, heat of the exhaust gas can be absorbed via the exhaust gas heat exchanger 41, whereby the waste heat of the engine 2 can be effectively utilized for the electric power generation by the electric generator 56 regardless of the state of the EGR circuit 30.

Second Embodiment

Figure 3:
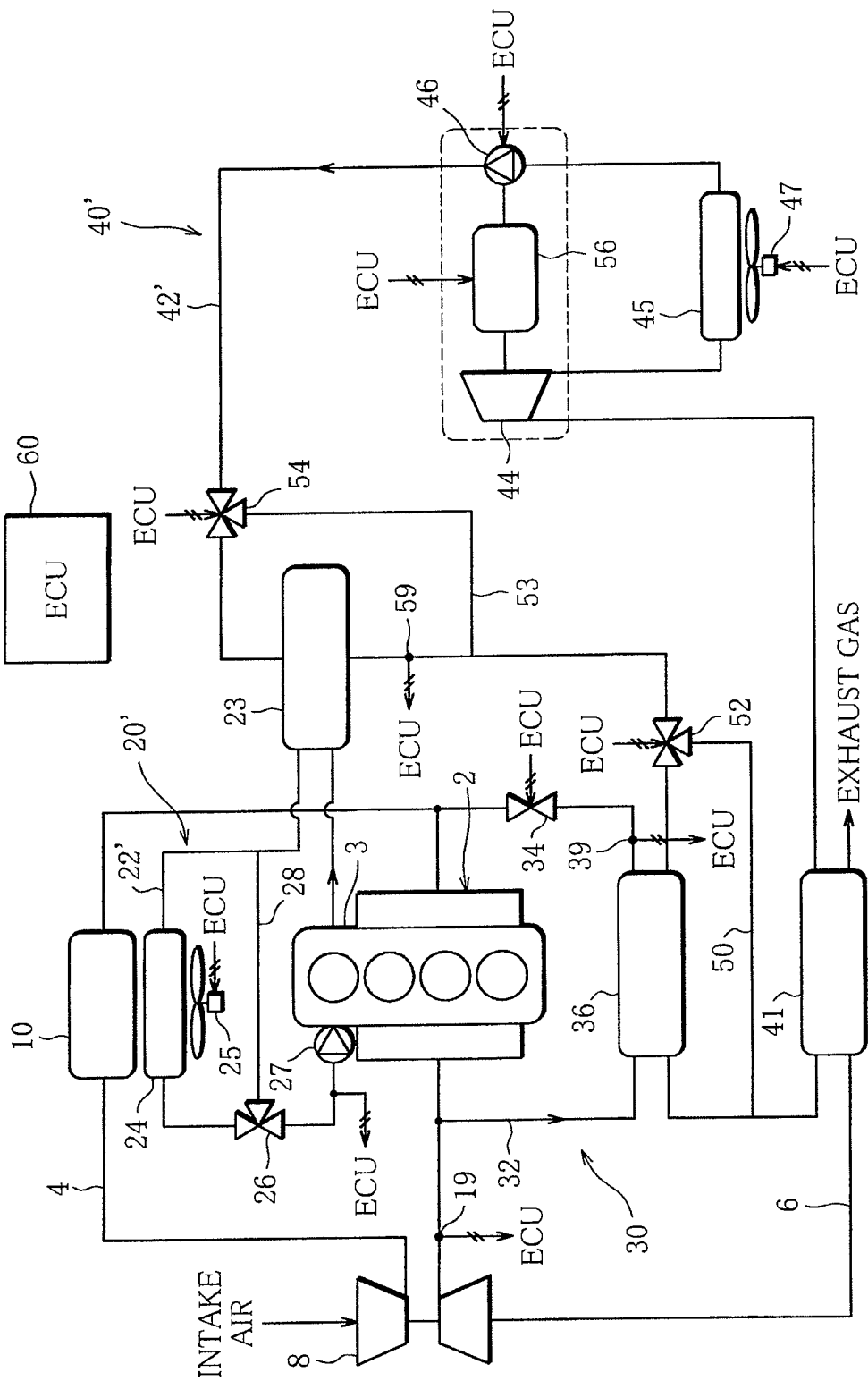
FIG. 3 schematically illustrates a waste heat utilization apparatus for an internal combustion engine according to a second embodiment of the present invention.

FIG. 3 schematically illustrates a waste heat utilization apparatus for an internal combustion engine according to a second embodiment of the present invention.

The second embodiment differs from the first embodiment in that the Rankine circuit 40 additionally utilizes heat of the cooling water flowing through the cooling water circulation passage 22 of the cooling water circuit 20. In the following, the differences between the first and second embodiments will be explained.

As illustrated in FIG. 3, the engine 2 is provided with a cooling water circuit 20' including a cooling water circulation passage 22'. A preheater (cooling water heat exchanger, heat exchanger) 23 for transferring heat to a Rankine circuit 40' is inserted in the cooling water circulation passage 22' at a location upstream of the radiator 24 as viewed in the flowing direction of the cooling water.

The preheater 23 is inserted in a circulation path 42' of the Rankine circuit 40' at a location upstream of the EGR cooler 36 and between the pump 46 and the three-way valve 52. That is, in the Rankine circuit 40' of the second embodiment, the preheater 23 is arranged on the most upstream side, then the EGR cooler 36 is arranged downstream of the preheater 23, and the exhaust gas heat exchanger 41 is arranged on the most downstream side, as viewed in the flowing direction of the working fluid.

The preheater 23 is arranged upstream of the EGR cooler 36 for the following reason: The evaporating temperature of the working fluid is higher than or equal to 100° C., for example, 150° C., and the temperature of the cooling water is lower than that of the working fluid, for example, 80° C. Thus, the working fluid is unable to absorb heat from the preheater 23 unless the preheater 23 is arranged upstream of the EGR cooler 36.

Also, the circulation path 42' of the Rankine circuit 40' is provided with a preheater bypass passage (cooling water heat exchanger bypass passage) 53 bypassing the preheater 23. A three-way valve (second regulating valve) 54 is inserted at the diverging point where the preheater bypass passage 53 diverges from the circulation path 42'. The three-way valve 54 is electrically connected to the output side of the ECU 60.

Further, a working fluid temperature sensor 59 for detecting the temperature Tr of the working fluid is arranged in the circulation path 42' of the Rankine circuit 40' at a location downstream of the preheater 23.

Operation of the waste heat utilization apparatus of the second embodiment configured as described above will be now explained.

When the engine body 3 of the engine 2 is started in a cold state and the temperature Tw of the cooling water in the cooling water circuit 20' is lower than the predetermined temperature T1, the cooling water is caused to bypass the radiator 24 by the thermostat 26. At this time, the three-way valve 54 of the Rankine circuit 40' is operated to cause the working fluid to flow through the preheater bypass passage 53, thereby preventing the working fluid from flowing into the preheater 23. This avoids a situation where the heat of the cooling water of the engine body 3 is needlessly absorbed by the working fluid of the Rankine circuit 40', with the result that warm-up of the engine body 3 is expedited.

After the engine body 3 is warmed up and the temperature Tw of the cooling water reaches the predetermined temperature T1, the cooling water in the cooling water circuit 20' is caused to flow through the radiator 24 to be cooled, and the three-way valve 54 of the Rankine circuit 40' is operated to cause the working fluid to flow through the preheater 23. Consequently, the working fluid in the Rankine circuit 40' begins to absorb heat of the cooling water of the engine body 3 through the preheater 23, so that the temperature of the cooling water lowers while the temperature of the working fluid rises.

When the engine 2 is operating in such a state that the EGR gas can be recirculated to the intake side, the EGR gas is allowed to flow through the EGR passage 32 at a flow rate corresponding to the opening of the EGR valve 34. If, in this case, the three-way valve 52 of the Rankine circuit 40' is operated to cause the working fluid to flow through the EGR cooler 36, heat is transferred in the EGR cooler 36 from the EGR as to the working fluid flowing through the circulation path 42'. As a result, the temperature of the EGR gas lowers, and the temperature and pressure of the working fluid rise.

After absorbing heat in the EGR cooler 36, the working fluid flowing through the circulation path 42' of the Rankine circuit 40' further absorbs heat of the exhaust gas in the exhaust as heat exchanger 41. Consequently, the temperature of the exhaust gas lowers, and the temperature and pressure of the working fluid further increase.

The working fluid thus raised in temperature and pressure flows into the expander 44, which then generates rotary driving force to cause the electric generator 56 to generate electric power. Also, since the pump 46 is driven, the working fluid is caused to circulated through the circulation path 42'.

Thus, in the second embodiment, heat of the cooling water in the cooling water circuit 20', heat of the EGR gas in the EGR circuit 30 and heat of the exhaust gas in the exhaust passage 6 are absorbed by the working fluid flowing through the circulation path 42' of the Rankine circuit 40', and the electric generator 56 is driven by the working fluid raised in temperature and pressure, to generate electric power. The amount of heat (heat transfer amount) that the working fluid absorbs in each of the preheater 23 and the EGR cooler 36 is adjusted appropriately by the ECU 60.

For the preheater 23, the amount of heat absorbed by the working fluid is controlled in accordance with the cooling water temperature Tw detected by the cooling water temperature sensor 29 so that the temperature Tw of the cooling water being returned to the engine body 3 may not become lower than or equal to the aforementioned predetermined temperature T2 (specified temperature, e.g., 80° C.). Specifically, the amount of heat absorbed by the working fluid can be controlled by adjusting the flow rate of the working fluid flowing through the preheater 23, and therefore, the opening of the three-way valve 54 is variably controlled by the ECU 60 to adjust the flow rate of the working fluid flowing through the preheater 23 so that the cooling water temperature Tw may not become lower than or equal to the predetermined temperature T2. Consequently, the cooling water temperature Tw is kept at a temperature higher than the predetermined temperature T2, thus preventing the engine efficiency from lowering due to excessive cooling of the engine body 3.

Also, if the cooling water temperature Tw becomes higher than the predetermined temperature T2, operation of the cooling fan 25 is controlled appropriately so that the temperature Tw of the cooling water cooled by the radiator 24 may be kept at the predetermined temperature T2.

As for the EGR cooler 36, the amount of heat absorbed by the working fluid is controlled in accordance with the EGR gas temperature Tegr detected by the EGR gas temperature sensor 39 so that the temperature Tegr of the EGR gas recirculated to the intake side may be kept at the predetermined temperature T3. The predetermined temperature T3 is set to a temperature higher than or equal to 100° C., for example, in the range of 150° C. to 200° C., as in the first embodiment.

Specifically, as in the first embodiment, the load of the electric generator 56 is variably controlled to adjust the pressure of the working fluid, or the displacement of the pump 46 is variably controlled to adjust the flow rate of the working fluid, or the opening of the three-way valve 52 is variably controlled to adjust the flow rate of the working fluid, so that the EGR gas temperature Tegr may be kept at the predetermined temperature T3. As an alternative, the opening of the three-way valve 54 is variably controlled to adjust the flow rate of the working fluid flowing through the preheater 23 and thereby adjust the amount of heat absorbed in the preheater 23 so that the transfer of heat from the EGR gas to the working fluid in the EGR cooler 36 may be promoted. These control methods may be selectively employed in combination so that the EGR gas temperature Tegr may be kept at the predetermined temperature T3.

Figure 4:
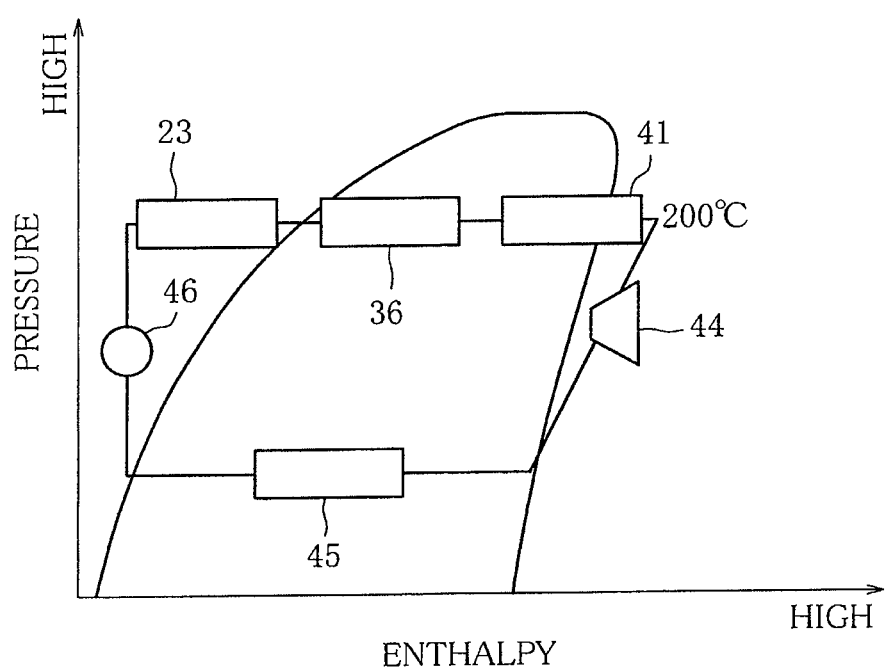
FIG. 4 is a schematic Mollier diagram illustrating the second embodiment.

Thus, in the waste heat utilization apparatus according to the second embodiment of the present invention, the preheater 23 is arranged on the most upstream side, the EGR cooler 36 is arranged downstream of the preheater 23, and the exhaust gas heat exchanger 41 is arranged on the most downstream side, as viewed in the direction of flow of the working fluid in the Rankine circuit 40'. Accordingly, as seen from the schematic Mollier diagram of FIG. 4 illustrating the second embodiment, the working fluid flowing through the circulation path 42' of the Rankine circuit 40' first absorbs heat of the cooling water in the preheater 23, then absorbs heat of the EGR gas in the EGR cooler 36 to sufficiently lower the temperature of the EGR gas, and further absorbs heat of the exhaust gas in the exhaust gas heat exchanger 41. As a consequence, the expander 44 can be driven by the working fluid with its temperature and pressure sufficiently raised, with the result that the waste heat of the engine 2 can be effectively utilized for the power generation by the electric generator 56.

Especially in the waste heat utilization apparatus according to the second embodiment of the present invention, the flow rate of the working fluid flowing through the preheater 23 is adjusted so that the temperature Tw of the cooling water being returned to the engine body 3 may not become lower than or equal to the predetermined temperature T2 (e.g., 80° C.). Thus, while allowing the working fluid to appropriately absorb heat of the cooling water in the preheater 23, lowering in the performance of the engine 2 can be suppressed and also the working fluid can be made to sufficiently absorb heat of the EGR gas in the EGR cooler 36 arranged downstream of the preheater 23.

Also, as in the first embodiment, the load of the electric generator 56 is variably controlled to adjust the pressure of the working fluid, or the displacement of the pump 46 is variably controlled to adjust the flow rate of the working fluid, or the opening of the three-way valve 52 is variably controlled to adjust the flow rate of the working fluid, or the opening of the three-way valve 54 is variably controlled to adjust the flow rate of the working fluid flowing through the preheater 23, or these control methods are used in combination so that the temperature Tegr of the EGR gas may be kept at the predetermined temperature T3. Thus, while the EGR gas is recirculated, the EGR gas temperature Tegr can be reliably kept at the predetermined temperature T3 (e.g., 150° C. to 200° C.), and since the moisture contained in the EGR gas is prevented from condensing to produce acid, corrosion of the EGR passage 32, the EGR valve 34 and the like can be satisfactorily prevented.

On the other hand, while the engine 2 is operating in such a state that the EGR gas should not be recirculated to the intake side, heat of the EGR gas is not available to the Rankine circuit 40' because the EGR valve 34 is shut off so that the EGR gas may not be recirculated to the intake side. In such case, heat transfer takes place in the preheater 23 from the cooling water to the working fluid flowing through the circulation path 42' of the Rankine circuit 40' and also in the exhaust gas heat exchanger 41 from the exhaust gas to the working fluid, or depending on the cooling water temperature Tw or the working fluid temperature Tr, heat transfer takes place only in the exhaust gas heat exchanger 41 from the exhaust gas to the working fluid. As a result, the temperature and pressure of the working fluid increase.

Thus, even while the recirculation of the EGR gas is stopped, the working fluid in the Rankine circuit 40' is allowed to satisfactorily absorb heat of the cooling water of the engine body 3 or/and heat of the exhaust gas through the preheater 23 or/and the exhaust gas heat exchanger 41, whereby the waste heat of the engine 2 can be effectively utilized for the electric power generation by the electric generator 56 regardless of the state of the EGR circuit 30.

Third Embodiment

Figure 5:
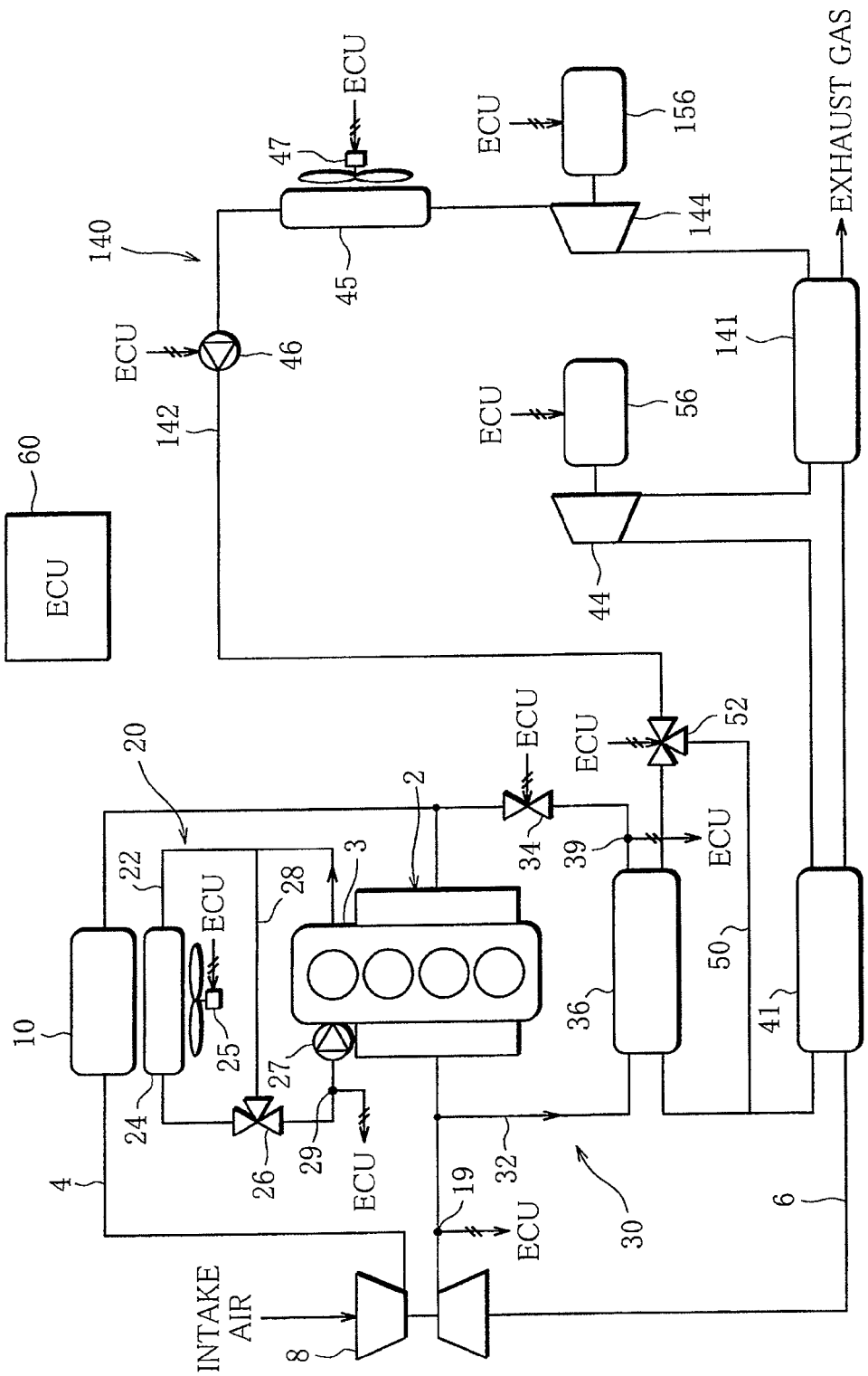
FIG. 5 schematically illustrates a waste heat utilization apparatus for an internal combustion engine according to a third embodiment of the present invention.

FIG. 5 schematically illustrates a waste heat utilization apparatus for an internal combustion engine according to a third embodiment of the present invention.

The third embodiment differs from the first embodiment in that double expansion is performed in a Rankine circuit 140. In the following, the differences between the first and third embodiments will be described.

As illustrated in FIG. 5, the Rankine circuit 140 includes a circulation path 142 for circulating a working fluid (e.g., water). The EGR cooler 36, the exhaust gas heat exchanger (heat exchanger, superheater) 41 which allows heat to transfer from the exhaust passage 6 to the working fluid, the expander 44, a second exhaust gas heat exchanger (heat exchanger, superheater) 141, a second expander 144, the Rankine condenser 45 and the pump 46 for circulating the working fluid are sequentially inserted in the circulation path 142 in the mentioned order, as viewed in the flowing direction of the working fluid, to constitute the Rankine circuit 140. The Rankine condenser 45 is provided with the cooling fan 47. The expander 44 is coupled with the electric generator 56 synchronously rotatably therewith, and the second expander 144 is coupled with a second electric generator 156 synchronously rotatably therewith. The electric generators 56 and 156 are electrically connected to the output side of the ECU 60.

Thus, in the Rankine circuit 140, the temperature and pressure of the working fluid are raised in the EGR cooler 36 and the exhaust gas heat exchanger 41, and after the working fluid raised in temperature and pressure is used for driving the expander 44 to generate rotary driving force, the temperature of the working fluid is again raised in the second exhaust gas heat exchanger 141 so that rotary driving force can be generated by the second expander 144 with use of the working fluid again raised in temperature.

At this time, the amount of heat that the working fluid absorbs in the EGR cooler 36 is appropriately controlled by the ECU 60, as in the first embodiment. Specifically, the amount of heat absorbed by the working fluid is controlled in accordance with the EGR gas temperature Tegr detected by the EGR gas temperature sensor 39 so that the temperature Tegr of the EGR gas recirculated to the intake side may be kept at the predetermined temperature T3. The predetermined temperature T3 is set to a temperature higher than or equal to 100° C., for example, in the range of 150° C. to 200° C., as in the first embodiment.

Specifically, like the first embodiment, the load of the electric generator 56 is variably controlled to adjust the pressure of the working fluid, or the displacement of the pump 46 is variably controlled to adjust the flow rate of the working fluid, or the opening of the three-way valve 52 is variably controlled to adjust the flow rate of the working fluid, so that the EGR gas temperature Tegr may be kept at the predetermined temperature T3. As an alternative, these control methods may be employed in combination. That is, the load of the electric generator 56, the displacement of the pump 46 and the opening of the three-way valve 52 may be variably controlled so that the EGR gas temperature Tegr may be kept at the predetermined temperature T3.

The load of the electric generator 56 is variably controlled in order to control the evaporating pressure by varying the load of the expander 44 connected to the Rankine condenser 45. Specifically, the load of the electric generator 56, and not the second electric generator 156, is variably controlled because, where the load of the electric generator 56 is light, for example, the expander 44 rotates at high speed to rapidly send out the working fluid toward the Rankine condenser 45, with the result that the evaporating pressure drops since the evaporation of the working fluid in the EGR cooler 36 does not catch up with such fast circulation of the working fluid. Where the load of the second electric generator 156 is variably controlled, on the other hand, the evaporating pressure does not change unless and until the first-stage expander 44 rotates fast, even if the load applied to the second-stage expander 144 is reduced and the expander 144 rotates at high speed.

Figure 6:
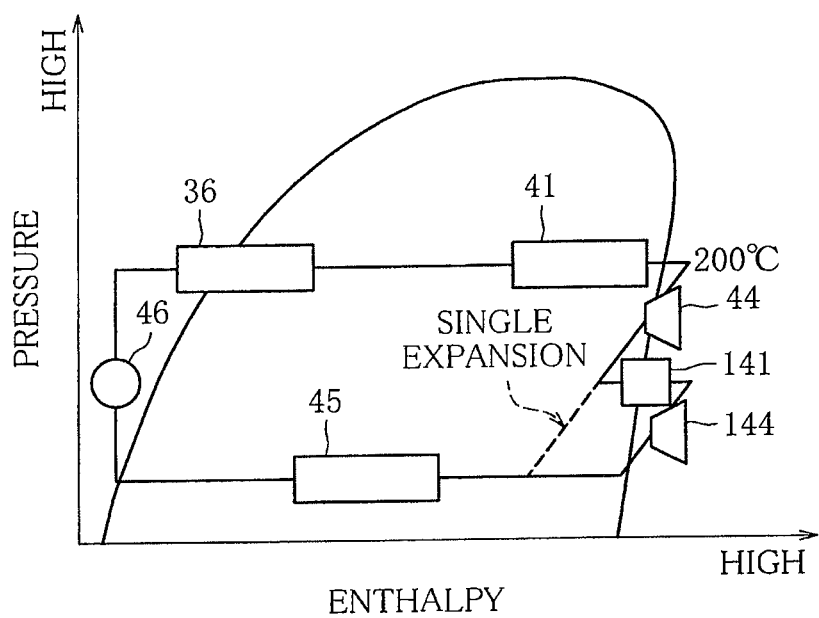
FIG. 6 is a schematic Mollier diagram illustrating the third embodiment.

Thus, in the waste heat utilization apparatus according to the third embodiment of the present invention, the EGR cooler 36 is arranged on the upstream side and the exhaust gas heat exchanger 41 and the second exhaust gas heat exchanger 141 are arranged downstream of the EGR cooler 36, as viewed in the direction of flow of the working fluid in the Rankine circuit 140. Accordingly, as seen from the schematic Mollier diagram of FIG. 6 illustrating the third embodiment, the working fluid flowing through the circulation path 142 of the Rankine circuit 140 first absorbs heat of the EGR gas in the EGR cooler 36 to sufficiently lower the temperature of the EGR gas, and then further absorbs heat of the exhaust gas in the exhaust gas heat exchanger 41 and the second exhaust gas heat exchanger 141. The temperature and pressure of the working fluid can therefore be raised so that the waste heat of the engine 2 can be effectively utilized for the power generation by the electric generator 56 and the second electric generator 156.

Especially in the waste heat utilization apparatus of the third embodiment, the Rankine circuit 140 is provided with the expander 44 and the second expander 144 and also with the exhaust gas heat exchanger 41 and the second exhaust gas heat exchanger 141, and is configured such that after the working fluid that has absorbed heat of the exhaust gas in the exhaust gas heat exchanger 41 is used for driving the expander 44 to cause the electric generator 56 to generate electric power, the working fluid is allowed to again absorb heat of the exhaust gas in the second exhaust gas heat exchanger 141 and then used for driving the second expander 144 to cause the second electric generator 156 to generate electric power. Double expansion performed in this manner makes it possible to utilize the waste heat of the engine 2 in a more effective manner.

Where the working fluid is ethanol as in the first and second embodiments, the working fluid can be made to retain its gaseous state at the inlet of the Rankine condenser 45 by subjecting the working fluid to isentropic expansion at 200° C. at the inlet of the expander 44. However, where the working fluid is water as in this embodiment, the working fluid takes the form of two, gas and liquid phases at the inlet of the Rankine condenser 45 even if subjected to isentropic expansion at 200° C. at the inlet of the expander 44. No problem arises if the amount of the working fluid in the liquid phase is small, but if a substantial part of the working fluid is in the liquid phase, a problem arises in that the expander 44 is damaged by erosion or the like. For this reason, according to this embodiment, the working fluid is raised in temperature and then again expanded on the way to the Rankine condenser 47.

Fourth Embodiment

Figure 7:
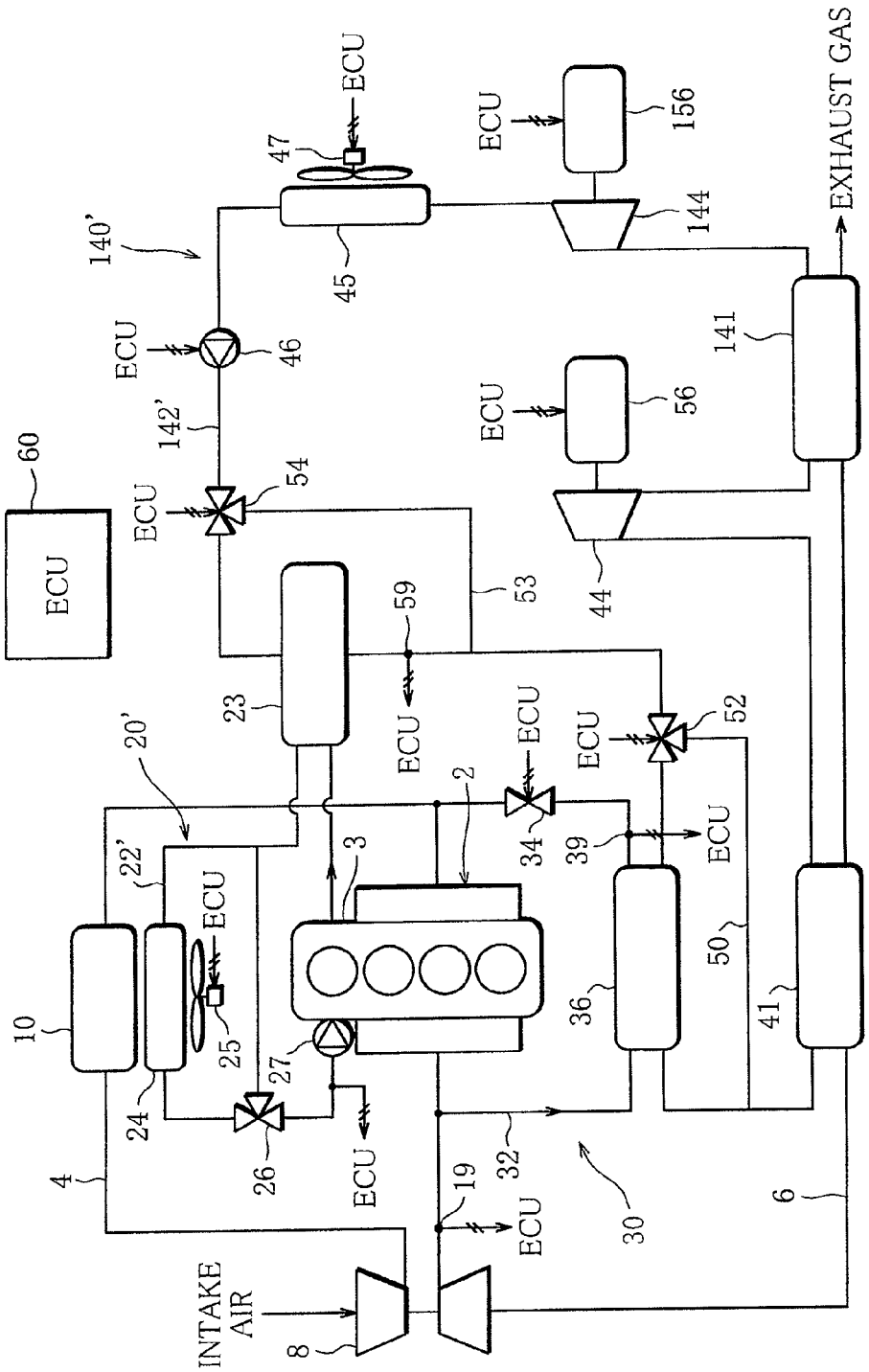
FIG. 7 schematically illustrates a waste heat utilization apparatus for an internal combustion engine according to a fourth embodiment of the present invention.

FIG. 7 schematically illustrates a waste heat utilization apparatus for an internal combustion engine according to a fourth embodiment of the present invention.

The fourth embodiment differs from the foregoing third embodiment in that a Rankine circuit 140' is configured to additionally utilize heat of the cooling water flowing through the cooling water circulation passage 22 of the cooling water circuit 20, like the second embodiment.

As illustrated in FIG. 7, the engine 2 is provided with the cooling water circuit 20' including the cooling water circulation passage 22'. The preheater 23 for transferring heat to the Rankine circuit 140' is inserted in the cooling water circulation passage 22' at a location upstream of the radiator 24 as viewed in the flowing direction of the cooling water.

As in the second embodiment, the preheater 23 is inserted in a circulation path 142' of the Rankine circuit 140' at a location upstream of the EGR cooler 36 and between the pump 46 and the three-way valve 52. That is, in the Rankine circuit 140' of the fourth embodiment, the preheater 23 is arranged on the most upstream side, then the EGR cooler 36 is arranged downstream of the preheater 23, and the exhaust gas heat exchanger 41 and the second exhaust gas heat exchanger 141 are arranged on the most downstream side, as viewed in the flowing direction of the working fluid. Also, like the second embodiment, the circulation path 142' of the Rankine circuit 140' is provided with the preheater bypass passage 53 bypassing the preheater 23, and the three-way valve 54 is inserted at the diverging point where the preheater bypass passage 53 diverges from the circulation path 142'. Further, the working fluid temperature sensor 59 for detecting the temperature Tr of the working fluid is arranged in the circulation path 142' at a location downstream of the preheater 23.

Figure 8:
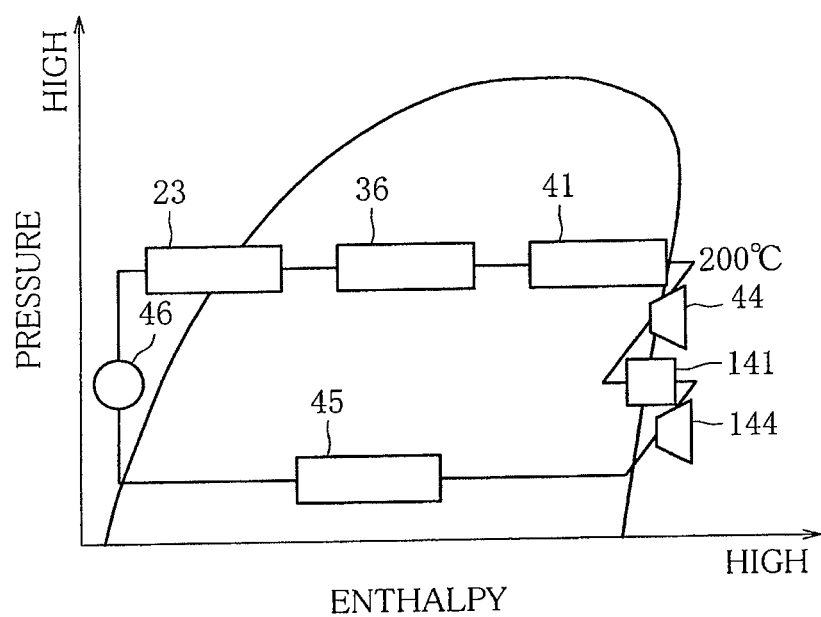
FIG. 8 is a schematic Mollier diagram illustrating the fourth embodiment.

Thus, in the waste heat utilization apparatus according to the fourth embodiment of the present invention, the preheater 23 is arranged on the most upstream side, the EGR cooler 36 is arranged downstream of the preheater 23, and the exhaust gas heat exchanger 41 and the second exhaust gas heat exchanger 141 are arranged on the most downstream side, as viewed in the direction of flow of the working fluid in the Rankine circuit 140'. Accordingly, as seen from the schematic Mollier diagram of FIG. 8 illustrating the fourth embodiment, the working fluid flowing through the circulation path 142' of the Rankine circuit 140' first absorbs heat of the cooling water in the preheater 23, then absorbs heat of the EGR gas in the EGR cooler 36 to sufficiently lower the temperature of the EGR gas, and further absorbs heat of the exhaust gas in the exhaust gas heat exchanger 41 and the second exhaust gas heat exchanger 141. Consequently, the advantageous effects of the second embodiment as well as those of the third embodiment provided by the double expansion can be achieved in the fourth embodiment, so that the temperature and pressure of the working fluid can be sufficiently raised, enabling even more effective utilization of the waste heat of the engine 2.

As described above with reference to the first to fourth embodiments, with the waste heat utilization apparatus of the present invention, a plurality of heat sources of the engine 2, inclusive of the EGR gas, can be efficiently used for the Rankine circuit 40, 40', 140, 140' without giving rise to condensation of the moisture contained in the EGR gas.

Meanwhile, the amount of heat that the working fluid in the Rankine circuit 40, 40', 140, 140' can absorb from the cooling water, the EGR gas and the exhaust gas increases or decreases depending on the load of the engine body 3 which varies with change in the load carried by the vehicle or the road gradient. Since the load of the engine body 3 increases or decreases in proportion to the temperature Tex of the exhaust gas, it is preferable that the operation of the cooling fan 47 associated with the Rankine condenser 45 should be controlled by the ECU 60 in accordance with the exhaust gas temperature Tex detected by the exhaust gas temperature sensor 19.

Specifically, as the exhaust gas temperature Tex detected by the exhaust gas temperature sensor 19 rises, the rotating speed of the cooling fan 47 is increased. By controlling the cooling fan 47 in this manner, it is possible to cause the Rankine circuit 40, 40', 140, 140' to function more efficiently even in a situation where the load carried by the vehicle is heavy or the road gradient is large.

Even if the amount of heat that the working fluid in the Rankine circuit 40, 40', 140, 140' can absorb from the cooling water, the EGR gas and the exhaust gas is sufficiently large and thus the evaporating pressure (high-pressure region pressure) input to the expander 44 can be raised, the condensation pressure (low-pressure region pressure) rises unless the amount of heat released by the Rankine condenser 45 is sufficiently large, resulting in an insufficient pressure ratio across the expander 44 and making it impossible to increase the energy output recovered by the expander 44. That is to say, the amount of heat released in the low-pressure region of the Rankine circuit 40, 40', 140, 140' has to be increased by an amount corresponding to the increase of the input in the high-pressure region of the Rankine circuit 40, 40', 140, 140'.

In this connection, a technique has already been known in the art wherein the pressure or temperature of the Rankine condenser 45 is detected and the rotating speed of the cooling fan 47 is controlled to increase the amount of heat released by the Rankine condenser 45 so that the pressure in the Rankine condenser 45 may become equal to a predetermined pressure value.

However, where the pressure or temperature of the Rankine condenser 45 is detected to control the rotating speed of the cooling fan 47 so that the pressure in the Rankine condenser 45 may become equal to the predetermined pressure value, the following problems arise: In cases where the vehicle has begun running on an upward slope and the load of the engine body 3 is increased, a state in which the waste heat increased due to increase in the load of the engine body 3 fails to be sufficiently recovered lasts for a while even though the waste heat can be recovered from the engine body 3, because change in the pressure or temperature of the Rankine condenser 45 is detected after a certain delay. Also, in cases where the vehicle starts to run on a level ground after running on an upward slope, the cooling fan 47 is kept operating to consume electric power wastefully even though the load of the engine body 3 has decreased and the amount of waste heat recoverable from the engine body 3 is small, because change in the pressure or temperature of the Rankine condenser 45 is detected after a certain delay.

Figure 9:
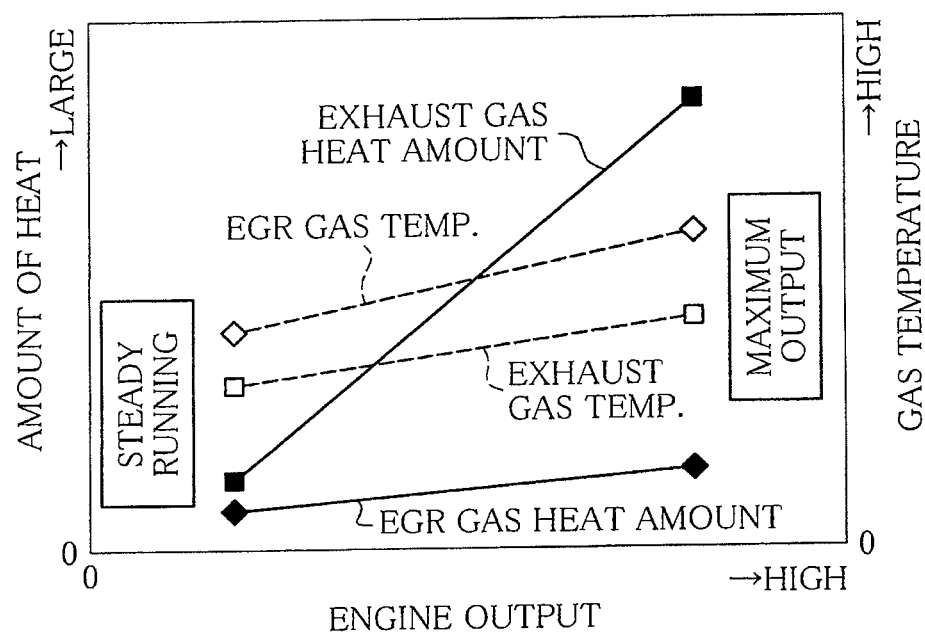
FIG. 9 illustrates the relationship between engine output and gas temperature in a heavy-duty vehicle such as a truck.

In the case of a heavy-duty vehicle such as a truck, on the other hand, the load of the engine body 3 varies under the influence of the load carried by the vehicle, the gradient of an upward slope, and the like. The inventors hereof researched on the engine load, and as a result of the research it was found out that, as illustrated in FIG. 9, the load (engine output) of the engine body 3 changes in proportion to the exhaust gas temperature (gas temperature) and also that the exhaust gas temperature responds to change in the engine load faster than the pressure or temperature of the Rankine condenser 45 in the Rankine circuit 40, 40', 140, 140'. From this it follows that the operation of the cooling fan 47 associated with the Rankine condenser 45 should preferably be controlled by the ECU 60 in accordance with the exhaust gas temperature Tex detected by the exhaust gas temperature sensor 19, whereby the recovery of waste heat can be controlled quickly in response to change in the load of the engine body 3 and the Rankine circuit 40, 40', 140, 140' can be made to operate efficiently. Also, by measuring the EGR gas temperature and using the measured temperature as the exhaust gas temperature, it is possible to control the waste heat recovery with higher responsiveness, so that the Rankine circuit 40, 40', 140, 140' can be operated more efficiently.

While the embodiments of the present invention have been described above, it is to be noted that the present invention is not limited to the foregoing embodiments and may be modified in various ways without departing from the scope and spirit of the invention.

For example, in the Rankine circuits 40, 40', 140 and 140' of the foregoing embodiments, rotary driving force is generated by the expander 44, 144 and is used to cause the electric generator 56, 156 to generate electric power so that the waste heat of the engine 2 may be converted into electrical energy. The manner of using the expander 44, 144 is not limited to such use, and the rotary driving force generated by the expander 44, 144 may be used, for example, to assist driving of the engine body 3.

Also, in the above description of the embodiments, diesel engine is exemplified as the engine body 3. The engine body 3 may be any other internal combustion engine and may be a gasoline engine, for example.

Further, in the foregoing embodiments, the exhaust gas heat exchanger 41 and the second exhaust gas heat exchanger 141 are arranged in the exhaust passage 6 in series with each other but may alternatively be arranged in the exhaust passage 6 in parallel with each other such that the heat exchanges 41 and 141 are located side by side.

In the foregoing embodiments, moreover, the amounts of heat absorbed in the preheater 23 and the EGR cooler 36 are adjusted by bypassing the working fluid but may alternatively be adjusted by bypassing the cooling water and the EGR gas, respectively.

Also, waste heat of the intercooler 10, an oil cooler, not shown, and the like may be additionally used as heat sink.

Further, the expander 44 and the second expander 144 may be coaxially arranged, and the electric generator 56 and the second electric generator 156 may be integrated into one.

EXPLANATION OF REFERENCE SIGNS

2: engine
3: engine body (internal combustion engine)
6: exhaust passage
20, 20': cooling water circuit
23: preheater (cooling water heat exchanger, heat exchanger)
29: cooling water temperature sensor (cooling water temperature detector)
30: EGR circuit
36: EGR cooler (heat exchanger)
39: EGR gas temperature sensor (EGR gas temperature detector)
40, 40', 140, 140': Rankine circuit
41: exhaust gas heat exchanger (heat exchanger, superheater)
44: expander
45: Rankine condenser (condenser)
46: pump
50: EGR cooler bypass passage
52: three-way valve (regulating valve)
53: preheater bypass passage (cooling water heat exchanger bypass passage)
54: three-way valve (second regulating valve)
56: electric generator
60: electronic control unit (ECU)
141: second exhaust gas heat exchanger (heat exchanger, superheater)
144: second expander
156: second electric generator

The invention claimed is:

1. A waste heat utilization apparatus for an internal combustion engine, comprising:
a Rankine circuit including a circulation path for circulating a working fluid, a plurality of heat exchangers for heating the working fluid with use of waste heat of the internal combustion engine, an expander for expanding the working fluid supplied thereto via the plurality of heat exchangers to generate rotary driving force, a condenser for condensing the working fluid supplied thereto via the expander, and a pump for delivering the working fluid supplied thereto via the condenser to the heat exchangers, wherein the plurality of heat exchangers, the expander, the condenser and the pump are sequentially inserted in the circulation path;
an exhaust gas heat exchanger inserted in an exhaust passage through which exhaust gas of the internal combustion engine is emitted to atmosphere;
an EGR circuit including an EGR passage for recirculating part of the exhaust gas as EGR gas to an intake side of the internal combustion engine, an EGR valve inserted in the EGR passage and opened and closed at least in accordance with an operating condition of the internal combustion engine, to permit and block recirculation of the EGR gas, and an EGR cooler inserted in the EGR passage to cool the EGR gas;
an EGR gas temperature detector arranged in the EGR passage at a location downstream of the EGR cooler, as viewed in a flowing direction of the EGR gas, to detect temperature of the EGR gas; and
a control unit configured to control an amount of heat transferred from the EGR gas in the EGR cooler at least while the EGR valve is opened to permit the recirculation of the EGR gas,
wherein the plurality of heat exchangers of the Rankine circuit are the EGR cooler and the exhaust gas heat exchanger and are configured such that the EGR cooler is located upstream of the exhaust gas heat exchanger as viewed in the flowing direction of the working fluid in the circulation path, that the working fluid is heated in the EGR cooler with use of heat of the EGR gas, and that the working fluid is heated in the exhaust gas heat exchanger with use of heat of the exhaust gas, and
wherein the control unit controls the amount of heat transferred from the EGR gas to the working fluid in the EGR cooler such that the temperature of the EGR gas detected by the EGR gas temperature detector falls within a predetermined temperature range.

2. The waste heat utilization apparatus according to claim 1, wherein the control unit variably controls pressure of the working fluid flowing through the EGR cooler by varying a load of the expander of the Rankine circuit such that the temperature of the EGR gas detected by the EGR gas temperature detector falls within the predetermined temperature range.

3. The waste heat utilization apparatus according to claim 1, wherein the control unit variably controls a flow rate of the working fluid flowing through the EGR cooler by varying a displacement of the pump of the Rankine circuit such that the temperature of the EGR gas detected by the EGR gas temperature detector falls within the predetermined temperature range.

4. The waste heat utilization apparatus according to claim 1, wherein:
 the Rankine circuit further includes an EGR cooler bypass passage diverging from the circulation path to bypass the EGR cooler and then joining the circulation path, and a regulating valve configured to regulate a flow of the working fluid to the circulation path and to the EGR cooler bypass passage, and
 the control unit variably controls a flow rate of the working fluid flowing through the EGR cooler by adjusting the regulating valve such that the temperature of the EGR gas detected by the EGR gas temperature detector falls within the predetermined temperature range.

5. The waste heat utilization apparatus according to claim 1, further comprising a cooling water circuit including a cooling water passage for causing cooling water of the internal combustion engine to circulate through a radiator, and a cooling water heat exchanger inserted in the cooling water passage to allow heat to transfer from the cooling water to the working fluid,
 wherein the cooling water heat exchanger is located upstream of the EGR cooler and the exhaust gas heat exchanger as viewed in the flowing direction of the working fluid in the circulation path of the Rankine circuit.

6. The waste heat utilization apparatus according to claim 5, wherein:
 the Rankine circuit further includes a cooling water heat exchanger bypass passage diverging from the circulation path to bypass the cooling water heat exchanger and then joining the circulation path, a second regulating valve configured to regulate a flow of the working fluid to the circulation path and to the cooling water heat exchanger bypass passage, and a cooling water temperature detector configured to detect temperature of the cooling water being returned to the internal combustion engine, and
 the control unit variably controls a flow rate of the working fluid flowing through the cooling water heat exchanger by adjusting the second regulating valve such that the temperature of the cooling water detected by the cooling water temperature detector does not become lower than or equal to a specified temperature.

7. The waste heat utilization apparatus according to claim 6, wherein the control unit variably controls an amount of heat absorbed in the cooling water heat exchanger by adjusting the second regulating valve to vary the flow rate of the working fluid flowing through the cooling water heat exchanger such that the temperature of the EGR gas detected by the EGR gas temperature detector falls within the predetermined temperature range.

* * * * *